United States Patent [19]

Rühling

[11] Patent Number: 5,469,042
[45] Date of Patent: Nov. 21, 1995

[54] CHARGING MONITOR FOR ELECTRICAL ACCUMULATORS

[75] Inventor: Klaus Rühling, Fuldabrück, Germany

[73] Assignee: Gagen Batterie AG, Germany

[21] Appl. No.: 101,611

[22] Filed: Aug. 3, 1993

[30]  Foreign Application Priority Data

Aug. 4, 1992 [DE] Germany .................. 42 25 746.8

[51] Int. Cl.[6] .................................. H01M 10/46
[52] U.S. Cl. .................................. 320/17; 320/29
[58] Field of Search .................. 320/5, 17, 35, 320/48, 29, 7, 16, 18; 324/434, 441, 431

[56]  References Cited

U.S. PATENT DOCUMENTS

| | | | |
|---|---|---|---|
| 3,305,754 | 2/1967 | Oaks et al. ..................... | 320/37 |
| 3,493,837 | 2/1970 | Starks et al. ..................... | 320/29 |
| 5,153,496 | 10/1992 | LaForge ..................... | 320/17 |

*Primary Examiner*—Thomas M. Dougherty
*Assistant Examiner*—Ed Tso
*Attorney, Agent, or Firm*—Townsend and Townsend Khourie and Crew

[57]  ABSTRACT

The invention relates to a circuit apparatus for the charge and discharge monitoring of electrical accumulators (20) or accumulator cells connected to one another in series to a charging current source (28). The apparatus includes one monitoring module (21) for each accumulator, or for each accumulator cell, with the monitoring module having a charging current limitation circuit and a first signal generator for displaying the operating state of the charging current limitation circuit. The charging current limitation circuit is acted on in dependence on a temperature signal corresponding to the temperature of the accumulator (20), or of the accumulator cell. A control signal circuit (29) is connected to the first signal generators, with the output signal of the control signal circuit (29) being applied to the charging current source (28) in order to control the charging current delivered by it.

15 Claims, 2 Drawing Sheets

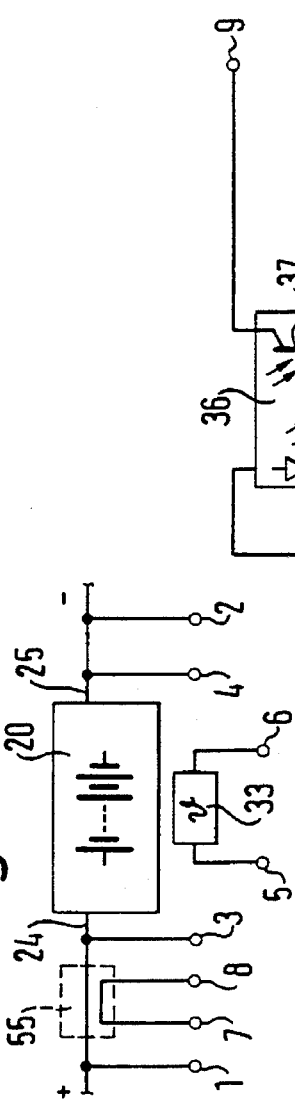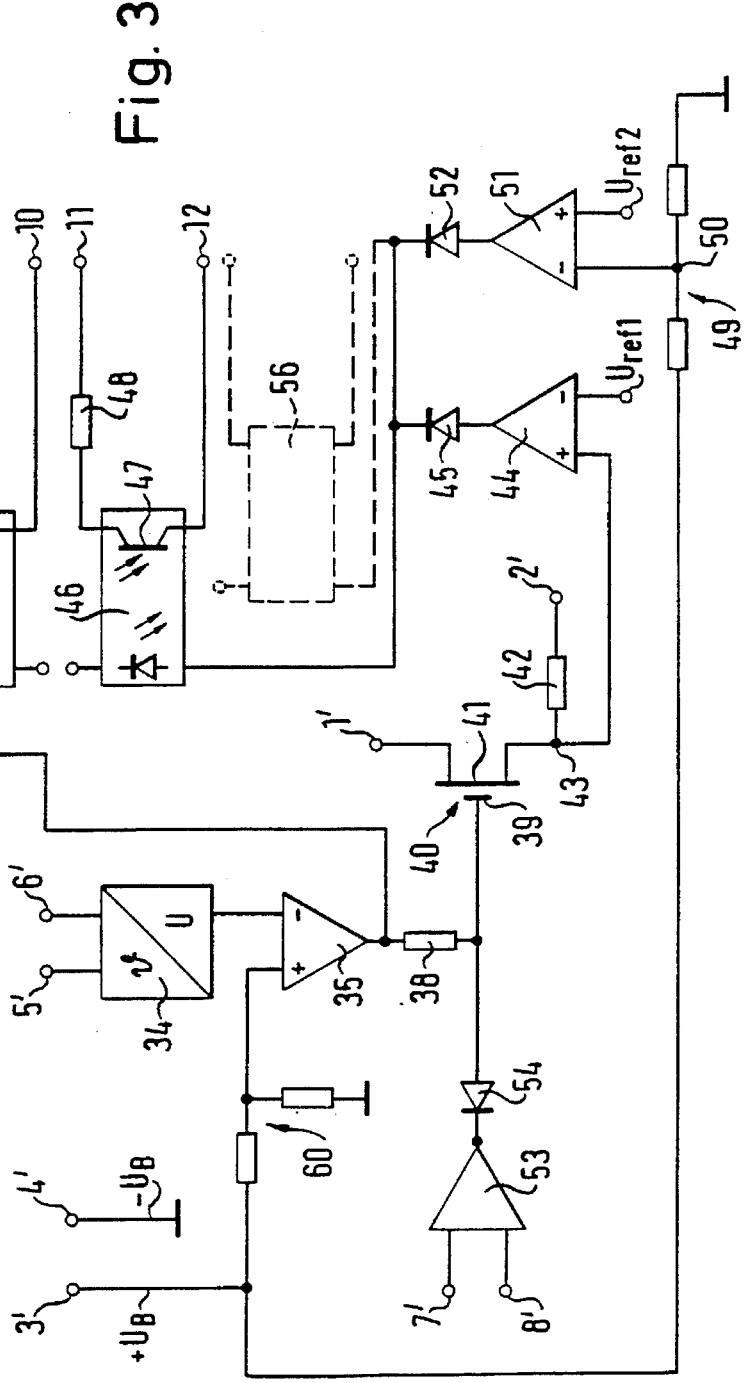

CHARGING MONITOR FOR ELECTRICAL ACCUMULATORS

FIELD OF INVENTION

The invention relates to a circuit apparatus for the charge monitoring of at least two electrical accumulators, or accumulator cells, connected to one another in series with a charging current source.

BACKGROUND OF INVENTION

If two or more accumulators are connected in series and this series circuit is treated as a unit, in particular during charging, problems can arise which lead to the premature failure of the accumulators. These problems are to be attributed to the fact that, as a consequence of manufacturing tolerances, each accumulator has its own electrical, chemical and thermal characteristics.

In particular, as a consequence of scatter between examples, different charging end currents can arise during charging of the accumulators and different accumulator temperatures caused by the construction of the apparatus can lead to different states of charge of the accumulators and to the overcharging of individual accumulators when the series circuit of accumulators is treated as a unit of identical accumulators.

In addition to this, problems also arise during discharging of the accumulators, since individual accumulators or accumulator cells do not all make available the required capacity or cannot all make available the required capacity. Such accumulators or accumulator cells can be damaged by being fully discharged or by change of polarity.

These problems lead, in particular with closed accumulators, for example with so-called drysafe-accumulators, to failures, since these accumulators cannot be topped up with water.

PRIOR ART

Various circuit apparatuses have been developed, in particular for charge monitoring, in order to avoid the problems which occur during the charging of accumulators.

In the Thermogard-System (trade mark) of the company Hagen Batterie AG the actual temperature of the accumulator is detected during the charging of an individual accumulator and communicated to a charging apparatus. In the charging apparatus there is provided an electrical regulating circuit which, in dependence on the actual accumulator temperature, adapts the charging current and thus the course of charging of an accumulator.

By means of continuous temperature monitoring the course of charging of an accumulator can be optimised, so that it can be caringly charged in the shortest time without damage as a consequence of a charging current which is too high, or as a consequence of overloading having to be feared.

The system is however not straightforwardly suitable for a series circuit of several accumulators which are to be simultaneously charged.

In another circuit apparatus which is available on the market for monitoring the availability of a stationary accumulator installation, the uniform full charge state of all accumulators or accumulator cells of the accumulator installation is monitored during the charge maintenance operation. Moreover, impermissibly high accumulator temperatures are detected through a temperature monitoring of several accumulators or accumulator cells.

During the discharge operation, the accumulators or accumulator cells are monitored to see whether the end of discharging is exceeded, or whether individual accumulators or accumulator cells are indeed discharged so far that the danger of a changed polarity exists.

The respectively detected disturbing events are stored in this known circuit and are indicated in a suitable manner. A corresponding acoustical alarm signal is generated for disturbances which can lead directly to damage to the accumulator installation.

A control of the charging apparatus is however not provided.

In a further control circuit available on the market for a charging apparatus for accumulators the accumulator temperature and its terminal voltage is detected by the control circuit arranged on the accumulator which brings about on/off operation of the charging apparatus. A voltage signal corresponding to the ideal terminal voltage at the detected temperature is formed from the temperature by a temperature-voltage converter and is compared with the detected terminal voltage. As long as the terminal voltage is less than the ideal voltage, a charging current delivered from a charging apparatus or from a suitable generator, for example in a motor vehicle, is switched on. Once the accumulator terminal voltage reaches the ideal value, the charging current is switched off.

This apparatus is however not suitable for a series circuit of two or more accumulators.

A further circuit apparatus available on the market includes for each accumulator cell an independent regulating circuit with a bypass circuit comprising a resistor and a transistor. The transistor is thereby acted on by a control circuit which detects the respective cell potential during a charge maintenance operation and sets it in dependence on the resistance of the bypass line, so that the respectively required charge maintenance current flows through the respective cell.

This circuit apparatus admittedly protects each accumulator cell from charge maintenance currents which are too high, is however not in the position of being able to control the charging apparatus required for the charging or charge maintenance operation.

PRINCIPAL OBJECT OF INVENTION

Starting from this prior art, the invention is based on the object of providing a further apparatus for charge monitoring for at least two electrical accumulators or accumulator cells which are connected to one another in series to a charging current source, which in particular ensures an individual, caring, full charging of each individual accumulator or the series circuit.

BRIEF DESCRIPTION OF INVENTION

In accordance with the invention this object is satisfied by a circuit apparatus comprising one monitoring module for each accumulator, or for each accumulator cell, to be monitored, with each monitoring module having a charging current limitation circuit and a first signal generator for displaying the state of operation of the charging current limitation circuit which is acted on in dependence on a temperature signal corresponding to the temperature of the accumulator or of the accumulator cell, and further comprising a control signal circuit connected with the first signal generators, with the output signal of the control signal circuit being applied to the charging current source in order to control the charging current delivered by it.

Thus, in accordance with the invention, a monitoring module is provided for each individual accumulator or for each individual accumulator cell by means of which the respective charging current can be individually limited to a permissible ideal value. At the same time a charging current limitation which has taken place is detected via a control signal circuit, which however only then acts on the charging current source, i.e. a charging apparatus or a generator circuit delivering a charging current, in order to reduce the charging current that is offered when a charging current limitation is effected at all accumulators or accumulator cells.

The degree of the reduction of the charging current should be such that the accumulator which requires the lowest charging current limitation, or the relevant cell, receives just so much current that charge current limitation is no longer necessary here. In this way, the energy requirement is minimised and simultaneously any otherwise possible overloading of the charge current limiting circuits is also prevented.

Through the use of a circuit apparatus in accordance with the invention with a series circuit of accumulators or accumulator cells, one can use charging apparatuses with a simplified construction.

As a result of the caring and rapid charging of the accumulators which can be achieved by means of the circuit apparatus of the invention, damage to the accumulators can be avoided so that their working life is increased.

The use of the circuit apparatus in electrical vehicles, in which current is frequently fed back into the accumulators during braking, makes possible the control of the feeding generator, so that even during rapid charging by the current fed back into the accumulators no overcharging of the accumulators occurs.

In order to obtain a temperature guided charging current limitation in a particularly expedient manner, a first comparator circuit is associated with each charging current limitation circuit, with the temperature signal and the potential present at an accumulator terminal being supplied to the comparator circuit. Moreover, the temperature signal can be applied to one input of a first comparator via a temperature-voltage converter, with the potential present at the accumulator terminal being applied to the other input of the first comparator. The output signal of the first comparator circuit is then preferably directly applied to the first signal generator and is applied to the charging current limitation circuit, via a resistor.

If a bypass line with a variable resistance is connected in parallel to the accumulator or to the accumulator cell as the charging current limitation circuit, then the charging current limitation takes place in a simple manner in that the charging current which is offered in excess is directed past the respective accumulator or accumulator cell via the bypass line. The bypass line preferably has a resistor and connected in series therewith a regulating component with a control circuit, the control input of which is acted on in dependence on the temperature signal. A power transistor with an input control circuit, in particular a field effect power transistor, is preferably provided as the regulating component.

In order to avoid excess currents in the circuit apparatus, and thus its impermissible heating up, each monitoring module preferably has an overcurrent protection circuit connected to a second signal generator, with the outputs of the second signal generators being connected to a second control signal circuit, the output signal of which is applied to the charging current source. Moreover, the overcurrent protection circuit preferably includes a comparator to the one input of which there is applied a voltage signal corresponding to the current in the bypass line and to the other input of which there is applied a reference signal.

In a particularly advantageous manner the circuit apparatus of the invention can also be used for discharge monitoring. For this purpose each monitoring module preferably has a third comparator circuit to which the voltage present at the accumulator terminal is applied and the output signal of which acts on a signal generator.

The third comparator circuit usefully has a potential divider lying between the positive and the negative terminals of the accumulator or of the accumulator cell, with the central tap of the potential divider being connected with one input of a comparator and with a reference signal being applied, to the other input of the comparator. The output signal of the signal generator acted on by the third comparator circuit is conveniently applied via a corresponding control signal circuit to a discharge monitoring circuit. Moreover, the signal generators are expediently formed as galvanically separating signal generators.

It is of advantage if the circuit apparatus of the invention makes available potential free signals for the control of the charging current source. One way of doing this is to provide a circuit in which the signal generators are formed as optic couplers having phototransistors, with the collector-emitter paths of the phototransistors being connected with the respective control signal circuit. It is particularly useful if in each case a weighted resistor is connected in series with the collector-emitter path of the respective phototransistor of the second signal generator.

In this arrangement the control signal circuit can be built up as a logic circuit, preferably a hard-wired logic circuit. The first control circuit can be an AND-circuit and the second control circuit can be an OR-circuit.

Here, the use of an AND-circuit for the signals indicating the state of operation of the charging current limitation circuits of the monitoring modules has the effect that the charging apparatus, or a different charging current source, makes available the full charging current so long as it can be exploited by an individual accumulator or by an individual accumulator cell without the danger of damage. As soon as a charging current limitation is necessary for all accumulators or accumulator cells, the charging current made available from the charging current source is switched downwardly until at least one accumulator or accumulator cell can fully exploit the reduced charging current.

The second control signals which indicate an excess current in the current limitation circuit during charging operation and the danger of deep discharging during discharging operation are linked together for the control of the charging current source, or for the charging of a discharge monitoring circuit respectively, via an OR-circuit, so that the presence of the signal already indicates possible damage of the corresponding monitoring module or of an accumulator or an accumulator cell.

LIST OF FIGURES

The invention will be described in more detail in the following by way of example with reference to the drawing in which are shown:

FIG. 1 a schematic block circuit diagram of a circuit apparatus for the charge and discharge monitoring of electrical accumulators connected in series, FIG. 2 a schematic circuit diagram of the terminals of a monitoring module at an accumulator, and FIG. 3 a schematic circuit diagram of the monitoring module.

DESCRIPTION OF PREFERRED EMBODIMENTS

Figure 1:
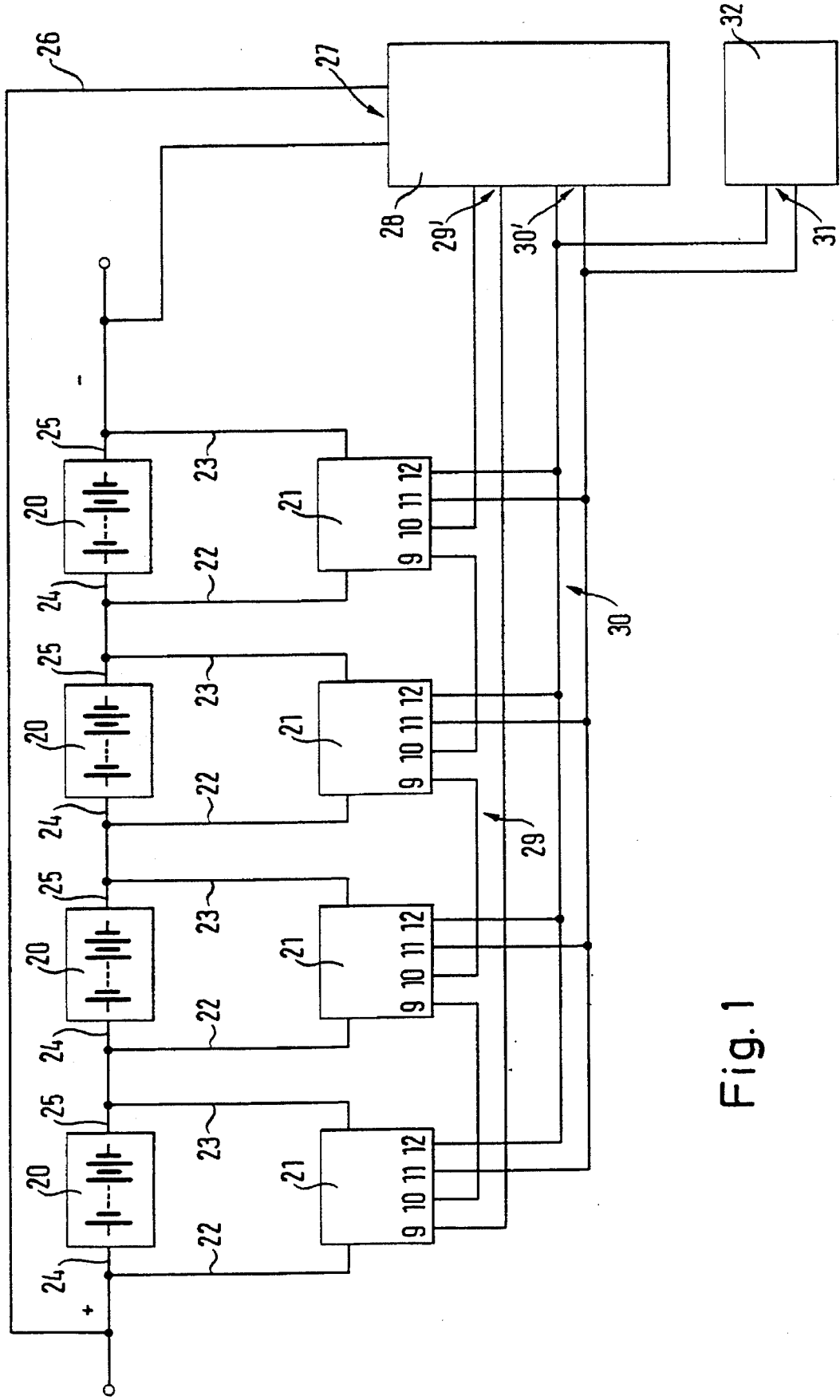

Components which correspond to one another in the different figures of the drawing are designated with the same reference numerals.

As FIG. 1 shows, a monitoring module 21 is associated with each of the, for example, four accumulators 20 connected in series, with the monitoring modules 21 respectively being connected via signal lines 22, 23 with the respective positive and negative terminals 24 and 25 respectively of the accumulators 20.

The series circuit of the accumulators 20 is connected via lines 26 with a charging output 27 of a charging apparatus 28.

The monitoring modules 21 each have first signal outputs 9, 10 at which a potential-free signal can be set and which are connected in series with one another via a first control signal circuit 29 to a first signal input 29' of the charging apparatus 28. A second signal input 30' of the charging apparatus 28 is connected via a second control signal circuit 30 with second signal outputs 11, 12 of the monitoring modules, at which a second potential-free signal can be set and which are connected in parallel to one another. The second signal outputs 11, 12 are, moreover, connected via the second control signal circuit 30 with a signal input 31 of a discharge monitoring circuit 32.

The construction of each monitoring module 21 and its connection to an accumulator 20 will be explained in more detail in the following with reference to FIGS. 2 and 3. Each monitoring module 21 has a temperature sensor 33 arranged at the accumulator 20 for detecting the temperature of the associated accumulator 20. Connection terminals 5, 6 of each temperature sensor 33 are connected with the connection terminals 5', 6' of a temperature-voltage converter 34. A temperature dependent voltage signal is applied by the temperature-voltage converter 34 to the inverting input of a comparator 35. The non-inverting input of the comparator 35 is connected to the central tap of a potential divider 60 which is connected between the connection terminal 3' which is connected to the connection terminal 3 at the positive terminal 24 of the accumulator 20 and earth, so that a voltage corresponding to the positive accumulator potential $+U_B$ is applied to the non-inverting input. The signal output of the comparator 35 is directly applied to an input of a first optic coupler 36 serving as the signal generator, with the phototransistor 37 of the optic coupler connecting the first signal outputs 9, 10 of the monitoring module 21 with one another. In place of an optic coupler, another galvanically separating signal generator can be used as the signal generator 36, for example a magnetic coupler with a coil and a magnetic field dependent resistor.

The output of the comparator 35 is connected via a resistor 38 to a control input 39 of a regulating component with a control circuit, for example a field-effect power transistor 40.

The conductive path 41 of the field-effect power transistor 40 is connected with a resistor 42 in series between the connection terminals 1', 2' of which the one is connected with a connection terminal 1 and the other is connected with a connection terminal 2 to the positive and negative connections 24 and 25 respectively of the accumulator 20.

In this way a regulation path with a bypass line 41, 42 is provided by means of which the excess current offered by the charging apparatus 28 can be directed past the accumulator 20. In this respect, comparator 35 compares a voltage corresponding to the voltage $U_B$ present at the positive terminal 24 of the accumulator 20, with a temperature-dependent voltage signal and delivers an output signal for the control input 39 of the power-field-effect transistor 20 when the potential corresponding to the potential $U_B$ present at the positive terminal 24 of the accumulator 20 is greater than the temperature-dependent potential signal. This causes the conductive path 41 of the field-effect transistor 40 to become conductive, so that the charging current flows past the accumulator 20 via the bypass line 40, 42. In this arrangement it is important that the charging current is led past the accumulator 20 via lines which are not identical with the measurement lines for tapping off the accumulator potential.

For thermal reasons the field-effect power transistor 40 can be arranged outside of the module 21. In this way, possible heating-up of the remaining electronics by the field-effect power transistor is avoided.

The output signal of the comparator 35 which is simultaneously present at the optic coupler 36 also causes the collector-emitter path of the phototransistor 37 to become conductive. In this way a potential-free signal is set at the first signal outputs 9, 10.

If this regulating case occurs in all monitoring modules 21, then the excess current offered at all monitoring modules 21 by the charging apparatus 28 is led past the accumulators 20 and if, as a consequence, the potential-free signals are set at all the first signal outputs 9, 10 of the monitoring modules 21, then a corresponding control signal is present at the signal input 29' of the charging apparatus 28 via the first control signal circuit 29 and the current delivered by the charging apparatus 28 is switched down or reduced until one of these first potential-free signals is reset.

Accordingly, control signal circuit 19 is hard wired in the manner of an AND-circuit to ensure that the charging current offered by the charging apparatus 28 is kept at a relatively high level for as long as this current is required to charge at least one accumulator 20.

In order to protect the bypass line via the field-effect power transistor 42, and thus the monitoring module 21, from currents which are too high, and thus from temperatures which are too high, a voltage is tapped off at the connection point between the field-effect transistor 40 and the current limiting resistor 42. This voltage is applied to the non-inverting input of a second comparator with a reference voltage $U_{ref1}$ being applied to the inverting input of the second comparator 44. The output signal of the second comparator 44 is applied via a diode 45 to an input of a second optic coupler 46 serving as a galvanically separating signal generator. The phototransistor 47 of the second optic coupler 46 is connected with its collector-emitter path between the second signal outputs 11, 12 of the monitoring module. If the voltage tapped off at the connection point 43 exceeds the reference voltage $U_{ref1}$, then the collector-emitter path of the phototransistor 47 becomes conductive and the charging apparatus 28 detects a corresponding control signal at its second signal input 30' connected to the second control signal circuit 30 and thereby detects that excess current has occurred within at least one of the monitoring modules, i.e. a charging current which exceeds the maximum permissible current through the field-effect power transistor.

In this case, the charging apparatus 28 reduces or switches down stepwise the charging current which is offered until the excess current has been at least reduced if not stopped alltogether. Second control signal circuit 30 is thus hard-wired in the manner of an OR-circuit through the parallel connection of the individual second signal outputs 11, 12, and thus of the phototransistors 47 which connect these via the second control signal circuit 30. In order to detect at which of the individual accumulators 20 an excess current has arisen in the monitoring module 21, a resistor 48 can be connected in series with the collector-emitter path of the phototransistor 47 between the phototransistor 47 and, for example, the second signal output 11, with the individual resistancies of the monitoring modules 21 having different resistance values, i.e. being weighted.

In order to monitor each individual accumulator 20 for damaging deep discharging during a discharging operation of the accumulators 20, i.e. to prevent each accumulator from being discharged below a safe level, a voltage divider 49 is connected between the earth of the monitoring module 21, which is connected via a connection terminal 4' and a connection terminal 4 connected thereto, to the negative terminal 25 of the accumulator and the connection terminal 3' to which the positive accumulator potential is applied, with the central tap 50 of the voltage divider being connected to an inverting input of a third comparator 51 with a reference potential $U_{ref2}$ being applied to the non-inverting input of the third comparator 51. The output signal of the third comparator 51 is applied via a diode 52 to the optic coupler 46.

If the potential at an accumulator sinks during discharge operation below a critical value which, for example, lies at 10,2 V for a 12 V accumulator, which is however to be matched to the special circumstances, then this is detected by the comparator 51 and is communicated to the discharge monitoring circuit 32 via the potential-free signal generated by the optic coupler 46.

The discharge monitoring circuit 32 causes, on the occurrence of an undervoltage, either a reduction of the maximum permitted discharge current, or a separation of the load from the accumulators.

An output of a fourth comparator 53 is connected to the control electrode 39 of the field-effect transistor 40 via a diode 54, the anode of which is connected to the control input 39. The inputs of the fourth comparator 53 are connected via connection terminals 7', 8' to corresponding connection terminals 7, 8 of a current sensor 55 which detects the charging or discharging current through the respective accumulator 20 in the region of the positive terminal 24 of the accumulator 20. In this way the current direction is recognised so that during charging operation a discharging of the accumulator 20 via the bypass line 40, 42 is prevented.

The apparatus described can also be used for charge and discharge monitoring in electrical vehicles, in which a plurality of accumulators are connected in series for the driving of an electric motor. In such electric vehicles the electric motor is frequently operated as a generator during braking so that current can thereby be fed back into the accumulators. If this current, the recuperation current, which is delivered during braking, is not limited, then the accumulators can be overcharged, whereby damage can arise.

It is in particular also possible in this arrangement to apply the output signal of the third comparator 51 to a third galvanically separating signal generator 56 which is shown in broken lines in FIG. 3, which then indicates the occurrence of an undervoltage, so that the decision of whether an overcurrent is present in charging operation, or whether an undervoltage is present during discharge operation is made easier. This is in particular of advantage when the described circuit is in use in an accumulator-driven vehicle during the driving operation of which charge operation and discharge operation take place alternately as a consequence of alternating acceleration and braking operation.

In using the apparatus described, damage during charge operation can be prevented in that the electric motor operated as a generator, or a braking regulator which is associated with the latter, is controlled by the output signals of the monitoring modules, so that the danger of damaging the accumulators during braking as a consequence of overcharging is overcome.

If damage to the accumulators in the case of an undervoltage is prevented during discharging operation through separation of the accumulators from the load, then an "emergency-on" circuit must be provided, in particular when using the described circuit in an electrical vehicle, so that this does not remain stationary at a point of danger.

I claim:

1. Circuit apparatus for monitoring the charging of at least two electrical accumulators (20) or accumulator cells connected to one another in series with a charging current source (28), the apparatus comprising one monitoring module (21) for each accumulator (20) or for each accumulator cell to be monitored, with each monitoring module (21) having a charging current limitation circuit (40, 42) and a first signal generator (36) for displaying the state of operation of the charging current limitation circuit (40, 42) which is acted on in dependence on a temperature signal corresponding to the temperature of the accumulator (20) or of the accumulator cell, the limitation circuit including a bypass line (40, 42) with a variable resistance (41) connected in parallel to the accumulator (20) or to the accumulator cell and further comprising a control signal circuit (29) connected with the first signal generators (36), with the output signal of the control signal circuit being applied to the charging current source (28) in order to control the charging current delivered by it, the control signal circuit (29) being in the form of a hard-wired AND-circuit.

2. Circuit apparatus in accordance with claim 1, wherein a first comparator circuit (34, 35) is associated with each charging current limitation circuit (40, 42), with the temperature signal and the potential present at an accumulator terminal (24) being supplied to the comparator circuit.

3. Circuit apparatus in accordance with claim 2, wherein the temperature signal is applied to one input of a first comparator (35) via a temperature-voltage converter (34), with the potential present at the accumulator terminal (24) being applied to the other input of the first comparator.

4. Circuit apparatus in accordance with claim 2, wherein the output signal of the first comparator circuit (34, 35) is directly applied to the first signal generator (36) and is applied to the charging current limitation circuit (40, 42) via a resistor (38).

5. Circuit apparatus in accordance with claim 1, wherein the bypass line (40, 42) has a resistor (42) and connected in series therewith a regulating component (40) with a control circuit, the control input (39) of which is acted on in dependence on the temperature signal.

6. Circuit apparatus in accordance with claim 5, wherein a power transistor with an input control circuit, in particular a field-effect power transistor (40), is provided as the regulating component.

7. Circuit apparatus in accordance with claim 1, wherein each monitoring module (21) has an overcurrent protection circuit (43, 44, 45) connected to a second signal generator (46), with the outputs (11, 12) of the second signal generators (46) being connected to a second control signal circuit (30), the output signal of which is applied to the charging current source (28).

8. Circuit apparatus in accordance with claim 7, wherein the overcurrent protection circuit includes a comparator (44) to the one input of which there is applied a voltage signal corresponding to the current in the bypass line (40, 42) and to the other input of which there is applied a reference signal.

9. Circuit apparatus for the charge and discharge monitoring of at least two electrical accumulators (20) or accumulator cells connected to one another in series with a charging current source, in particular in accordance claim 1, wherein each monitoring module (21) has a third comparator circuit (49, 51, 52) to which the voltage present at the accumulator terminal (24) is applied and the output signal of which acts on a signal generator (46).

10. Circuit apparatus in accordance with claim 9, wherein the comparator circuit has a potential divider (49) lying between the positive and the negative terminals (24 and 25 respectively) of the accumulator (20) or of the accumulator cell, with the central tap (50) of the potential divider being connected with one input of a comparator (51), and with a reference signal being applied to the other input of the comparator (51).

11. Circuit apparatus in accordance with claim 9, wherein the output signal of the signal generator (46, 56) acted on by the third comparator circuit is applied via a corresponding control signal circuit (31) to a discharge monitoring circuit (32).

12. Circuit apparatus in accordance with claim 1, wherein the signal generators (36, 46, 56) are formed as galvanically separating signal generators.

13. Circuit apparatus in accordance with claim 12, wherein the signal generators are formed as optic couplers (36, 46) having phototransistors (37, 47), and wherein the collector-emitter paths of the phototransistors (37, 47) are connected with the respective control signal circuit (29, 30).

14. Circuit apparatus in accordance with claim 13, wherein in each case a weighted resistor (48) is connected in series with the collector-emitter path of the respective phototransistor (47) of the second signal generator (46).

15. Circuit apparatus in accordance with claim 1, wherein the second control circuit (30) is in the form of a hard-wired OR-circuit.

* * * * *

UNITED STATES PATENT AND TRADEMARK OFFICE
CERTIFICATE OF CORRECTION

PATENT NO. : 5,469,042
DATED : November 21, 1995
INVENTOR(S) : Klaus Ruhling

It is certified that error appears in the above-indentified patent and that said Letters Patent is hereby corrected as shown below:

On title page, item

[73], the Assignee should read:

Hagen Batterie AG, Germany

Signed and Sealed this

Twenty-first Day of May, 1996

Attest:

BRUCE LEHMAN

Attesting Officer                    Commissioner of Patents and Trademarks